United States Patent
McHale et al.

(10) Patent No.: US 11,062,626 B2
(45) Date of Patent: Jul. 13, 2021

(54) BEATING HEART CONTROLLER AND SIMULATOR

(71) Applicant: AtriCure, Inc., Mason, OH (US)

(72) Inventors: Jonathon McHale, Mason, OH (US); Frank Fago, Mason, OH (US); Matthew Monti, Cincinnati, OH (US); Robert M. Trusty, Cincinnati, OH (US); John Wesley, Annapolis, MD (US); Jeffrey Paul Sites, Winston Salem, NC (US); Eric S. Norman, Kernersville, NC (US)

(73) Assignee: AtriCure, Inc., Mason, OH (US)

( * ) Notice: Subject to any disclaimer, the term of this patent is extended or adjusted under 35 U.S.C. 154(b) by 682 days.

(21) Appl. No.: 15/167,845

(22) Filed: May 27, 2016

(65) Prior Publication Data

US 2017/0116887 A1    Apr. 27, 2017

Related U.S. Application Data

(60) Provisional application No. 62/166,951, filed on May 27, 2015.

(51) Int. Cl.
G09B 23/30 (2006.01)

(52) U.S. Cl.
CPC ......... *G09B 23/306* (2013.01); *G09B 23/303* (2013.01)

(58) Field of Classification Search
None
See application file for complete search history.

(56) References Cited

U.S. PATENT DOCUMENTS

| | | | | |
|---|---|---|---|---|
| 4,536,893 A | * | 8/1985 | Parravicini | A61M 1/1062 601/153 |
| 4,861,330 A | * | 8/1989 | Voss | A61M 1/122 600/18 |
| 5,176,153 A | * | 1/1993 | Eberhardt | A61F 2/2472 128/897 |
| 5,634,797 A | * | 6/1997 | Montgomery | G09B 23/286 434/268 |
| 5,916,193 A | * | 6/1999 | Stevens | A61M 1/3659 604/28 |
| 5,951,301 A | * | 9/1999 | Younker | G09B 23/285 434/268 |
| 6,366,101 B1 | * | 4/2002 | Bruce | G01R 31/311 324/754.23 |
| 6,416,510 B1 | * | 7/2002 | Altman | A61B 18/1492 606/41 |
| 7,798,815 B2 | * | 9/2010 | Ramphal | G09B 23/306 434/262 |
| 8,834,172 B2 | * | 9/2014 | Rubinstein | G09B 23/285 434/267 |

(Continued)

OTHER PUBLICATIONS

Bouma et al.; "A new beating-heart off-pump coronary artery bypass grafting training model"; Oct. 9, 2014; https://academic.oup.com/icvts/article/20/1/7/2862566 (Year: 2014).*

(Continued)

*Primary Examiner* — William D Ermlick
(74) *Attorney, Agent, or Firm* — Levine Bagade Han LLP

(57) ABSTRACT

Systems, devices and methods for a surgical training tool that drives movement of an organ In order to reproduce a movement of that organ to mimic the conditions of a live surgical procedure.

17 Claims, 10 Drawing Sheets

(56) References Cited

U.S. PATENT DOCUMENTS

| | | | | |
|---|---|---|---|---|
| 8,920,176 B1* | 12/2014 | Yang | G09B 23/303 | 434/262 |
| 9,342,996 B2* | 5/2016 | King | G09B 23/28 | |
| 9,711,067 B2* | 7/2017 | Feins | G09B 23/306 | |
| 9,805,625 B2* | 10/2017 | Feins | G09B 23/303 | |
| 2001/0019818 A1* | 9/2001 | Yong | G09B 23/285 | 434/262 |
| 2002/0061503 A1* | 5/2002 | Chamberlain | G09B 23/28 | 434/267 |
| 2004/0033477 A1* | 2/2004 | Ramphal | G09B 23/306 | 434/272 |
| 2004/0260278 A1* | 12/2004 | Anderson | A61B 18/00 | 606/32 |
| 2007/0218437 A1* | 9/2007 | Lotano | G09B 23/34 | 434/236 |
| 2009/0112312 A1* | 4/2009 | LaRose | A61M 1/101 | 623/3.13 |
| 2009/0311662 A1* | 12/2009 | Ramphal | G09B 23/288 | 435/1.1 |
| 2013/0190796 A1* | 7/2013 | Tilson | A61F 2/2433 | 606/192 |
| 2013/0253641 A1* | 9/2013 | Lattouf | A61B 17/3421 | 623/2.11 |
| 2014/0303604 A1* | 10/2014 | Michler | A61M 25/10 | 604/540 |
| 2014/0370490 A1* | 12/2014 | Laizzo | A01N 1/0247 | 435/1.2 |
| 2015/0024362 A1* | 1/2015 | Feins | G09B 23/303 | 434/268 |
| 2016/0027345 A1* | 1/2016 | Carson | G09B 23/288 | 434/262 |
| 2016/0140878 A1* | 5/2016 | Fernandez | G09B 23/303 | 434/268 |
| 2016/0155365 A1* | 6/2016 | Tanabe | G09B 23/32 | 434/272 |
| 2016/0314716 A1* | 10/2016 | Grubbs | G09B 23/28 | |
| 2017/0056169 A1* | 3/2017 | Johnson | A61F 2/2418 | |
| 2018/0018904 A1* | 1/2018 | Okayama | G09B 23/303 | |
| 2018/0108276 A1* | 4/2018 | Ishiyama | G09B 23/32 | |
| 2020/0365057 A1* | 11/2020 | Fernandez | G09B 23/303 | |

OTHER PUBLICATIONS

AboutKidsHealth; Balloon Valvuloplasty; Dec. 11, 2009; https://www.aboutkidshealth.ca/Article?contentid=1669&language=English (Year: 2009).*

* cited by examiner

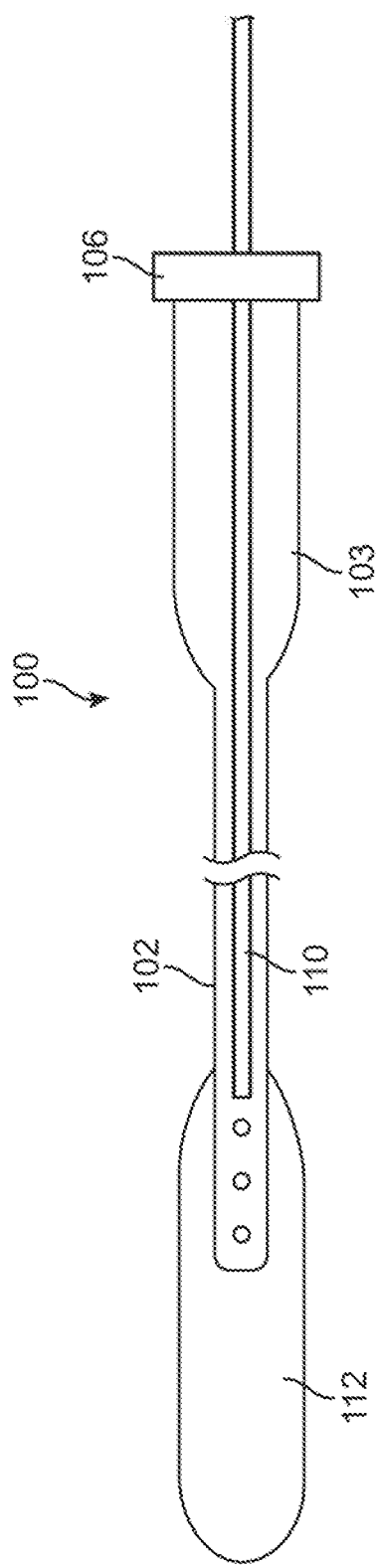
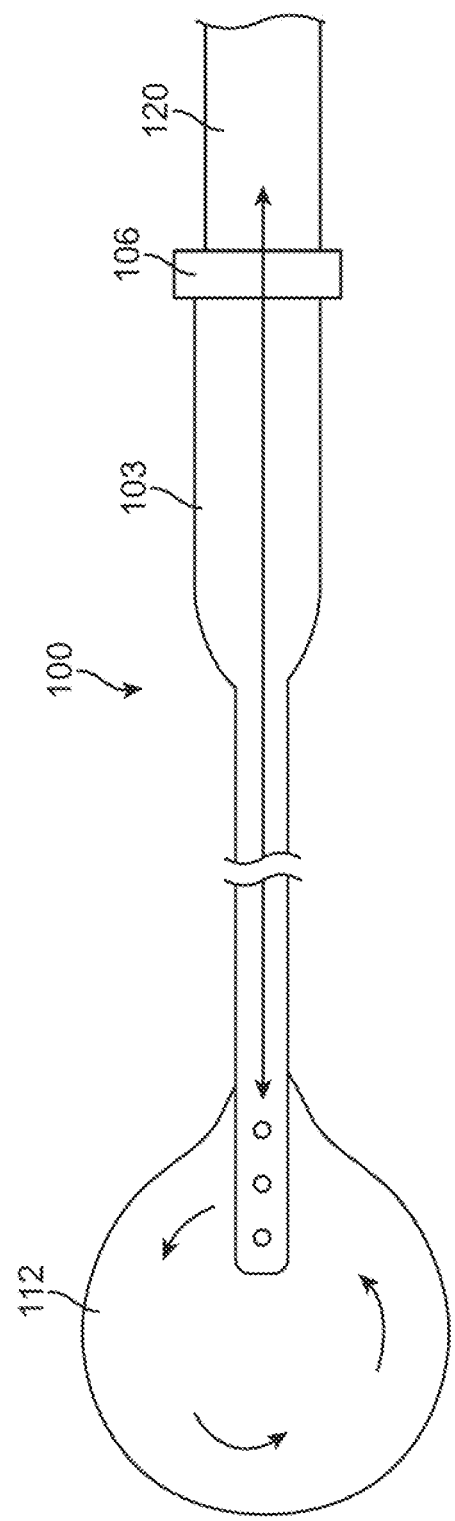
FIG. 7A
FIG. 7B

BEATING HEART CONTROLLER AND SIMULATOR

CROSS-REFERENCE TO RELATED APPLICATIONS

The present application is a non-provisional of U.S. Provisional Patent Application No. 62/166,951 filed on May 27, 2015, the content of which is incorporated herein by reference in its entirety.

FIELD OF THE INVENTION

The present invention relates to a surgical training tool that drives movement of an organ in order to reproduce a movement of that organ to mimic the conditions of a live surgical procedure. For example, actual surgical procedures on cardiac tissue can take place while the cardiac tissue cycles through contraction and dilation of the heart muscle. By providing a simulated model of a beating heart, a physician can benefit from training on a model that mimics the natural movement of heart tissue in a realistic but simulated manner. The purpose of the invention is to provide portable a means for more realistic training and product development for procedures on or around the heart. Cadaver hearts are deflated and lack the realism of a living beating heart so training with a beating heart simulator enhances the effectiveness of the training

BACKGROUND OF THE INVENTION

As medical technology advances there is a need for physicians to practice new surgical techniques using novel treatments as well as practice existing surgical skills using novel devices. There is a clear benefit to patients if a physician can train on an accurate model when preparing for an unfamiliar surgical procedure or when using an unfamiliar device. The need for such training is even more critical when the operative field includes a target organ that undergoes cyclic motion.

Cardiac surgery is one specific area that can benefit from an accurate training model. Traditionally, physicians would arrest the heart to cease or slow motion of the cardiac tissue. In order to avoid the complications that are associated with arresting heart motion, many cardiac procedures involve beating heart surgery where the physician performs the procedure while the cardiac tissue moves through a cyclic rhythm indicative of regular cardiac function. In the field of beating heart surgery, it is known to use a prosthetic model of a beating heart to simulate clinical situations of beating heart surgery. A prosthetic heart model attempts to duplicate the exposure and feel of a beating heart during surgery, and allows both the surgeon-in-training as well as the veteran surgeon the opportunity to develop skills needed for consistent results when performing cardiac surgery on the non-arrested heart.

Existing training models are disclosed in U.S. Pat. No. 6,685,481 to Chamberlain: U.S. Pat. No. 7,798,815 to Ramphal et al.; and U.S. Pat. No. 8,834,172 to Rubinstein et al. the entirety of each of which is incorporated by reference. However, these approaches either rely on: an artificial heart model specifically fabricated for the procedure (e.g., U.S. Pat. No. 6,685,481 to Chamberlain) animal organs to simulate human organs and positioned the non-human tissue within a mock chest cavity (e.g., U.S. Pat. No. 7,798,815 to Ramphal et al.); or rely on a simulated model where a tissue equivalent material includes an array of electrodes to form an artificial heart on which the simulated procedure is to be performed (e.g., U.S. Pat. No. 8,834,172 to Rubinstein et al.)

A downside of such artificial training models, apart from the cost involved in creating the artificial models, is that the artificial model may not properly represent the variation in anatomy that a physician will encounter when performing an actual procedure. For instance, the anatomy of many patients requiring cardiac surgery will be less than ideal due to the patient's age, obesity, scar tissue, as well as a variety of other conditions that affect individuals.

FIG. 1 provides a partial view of a body 2 to illustrate some of the problems that a physician encounters when performing a surgical procedure on organs within the body 2. The present example shows a heart 10 within a thoracic cavity that is encased by a ribcage 4 and sternum 6. As noted above, existing training models attempt to recreate the organ and surrounding environment but such models often cannot replicate the various tissue and anatomical structures that are found in human patients. Moreover, a physician can benefit from having to perform the procedure on the heart 10 while avoiding the various obstacles caused by the various tissue, anatomic structures, as well as non-target organs. In many cases, the training can involve minimizing damage to such tissue, anatomic structures, as well as non-target organs.

Virtual reality simulators may be able to provide a realistic patient anatomy, but such systems do not yet provide realistic physician to patient interface and are limited given the costs as well as environment in which they can be properly deployed.

In view of the above, there remains a need for a cardiac model that allows for a beating heart model that presents the challenges could simulate the range of normal and abnormal heart rhythms that may arise during surgery, such as those resulting from intra-operative events such as admission of drugs or from ventricular fibrillation.

It would be useful to have a beating heart simulator that provides a realistic environment for surgical training, including the simulation of the range of cardiac movement typically encountered in heart surgery.

The present invention provides such an apparatus, system, and method that is able to animate a cadaver heart. The present invention can provide a portable apparatus for more realistic training as well as product development for procedures on or around cardiac tissue using human cadaver hearts that are either removed from the body of the cadaver, or remain within the cadaver such that the surrounding anatomy provides a realistic environment for either training or product development purposes.

SUMMARY OF THE INVENTION

The present disclosure includes methods and devices for preparing a training model by animating a heart of a cadaver. In one variation a method for animating a heart includes advancing a first catheter having a first expandable member into the cadaver; advancing a second catheter having a second expandable member into the cadaver; positioning the first expandable member into a first ventricle of the cadaver heart; positioning the second expandable member into a second ventricle of the cadaver heart; coupling the first catheter to a first fluid path, the first fluid path being in fluid communication with a positive pressure source; coupling the second catheter to a second fluid path, the second fluid path being in fluid communication with the positive pressure source that provides a fluid flow; and monitoring a parameter of the fluid flow in the first catheter and the second catheter to control the fluid flow in the first fluid path and the second fluid path to pressurize and depressurize the first expandable member and the second expandable member respectively to produce a beating pattern in the cadaver heart.

A variation of the method includes the first fluid path, which comprises a first valve, and where the second fluid path comprises a second valve. In an additional variation, the method further includes an adjustable valve, where the first fluid path and second fluid path are fluidly isolated in the adjustable valve.

The method can monitor a parameter of the fluid flow that comprises a parameter selected from a group consisting of a time of flow, a volume of flow, a pressure, and a combination thereof.

In an additional variation, the method can also include advancing a third catheter having a third expandable member into the cadaver; positioning the third expandable member into a first atrium of the cadaver heart; coupling the third catheter to a third valve that is fluidly coupled to the positive pressure source; and where monitoring the parameter of the fluid flow further comprises monitoring the parameter of the fluid flow in the third catheter to control the third valve to pressurize and depressurize the third expandable member.

In a further variation, the method includes advancing a fourth catheter having a fourth expandable member into the cadaver; positioning the fourth expandable member into a second atrium of the cadaver heart; coupling the fourth catheter to a fourth valve that is fluidly coupled to the positive pressure source; and where monitoring the parameter of the fluid flow further comprises monitoring the parameter of the fluid flow in the fourth catheter to control the fourth valve to pressurize and depressurize the fourth expandable member.

The method can include a positive pressure source comprising a plurality of inflation sources where at least a first inflation source is fluidly coupled to the first valve and where a second inflation source is fluidly coupled to the second valve.

A variation of the method can include advancing the first catheter member into the cadaver by advancing the first catheter into a vascular body in the cadaver and fluidly coupled to the heart the cadaver.

The method can optionally include detaching a stiffening member from the first catheter prior to coupling the first catheter to the first fluid path.

The present disclosure also includes a system for displacing a heart tissue within a heart to reproduce a beating pattern. One variation of the system includes a plurality of tubes, each of the plurality of tubes being flexible to permit navigation through tortuous anatomy and having an expandable member coupled to a distal portion and a connector at a proximal portion, each of the plurality of tubes optionally includes at least one reinforcing member detachably coupled thereto, where the reinforcing member permits navigation of the plurality of tubes through a vascular lumen that is fluidly coupled to the heart to permit positioning of the expandable member in a chamber of the heart; a valve assembly configured to be coupled to a pressure source, the valve assembly having a plurality of ports; a controller coupled to the valve assembly and configured to operate the valve assembly to selectively control flow from the pressure source to the plurality of ports to create a plurality of fluid paths between the pressure source and each of the plurality of ports, such that the plurality of fluid paths are able to pressurize the expandable members when placed within the heart to reproduce the beating pattern.

A variation of the system includes a valve assembly that comprises at least two valves each having at least one port. In another variation, the valve assembly comprises at least four valves, each having at least one port.

Variations of the device include a first expandable member for at least one of the plurality of tubes comprises a first color and where a second expandable member for at least one of the tubes comprises a second color, where the first color and second color are visually distinguishable. Alternatively, or in combination, a first tube of the plurality of tubes comprises a first color and where a second tube of the plurality of comprises a second color, where the first color and second color are visually distinguishable.

The system of the present disclosure can comprise a controller that is configured to selectively control flow from the pressure source to the plurality of ports to simulate a beating heart pattern selected from the group consisting of: a normal beating heart rate from 60 to 100 beats per minute, a tachycardia rate, an atrial fibrillation, and a ventricular fibrillation.

Variations of the device can include a configuration where the at least one tube of the plurality of tubes comprises an expandable member that is detachable from a body of the tube. Furthermore, at least one tube of the plurality of tubes comprises an expandable members having a non-spherical expanded shape to conform to a chamber of the heart.

The expandable members can be non-distensible, distensible, or a combination thereof.

The system can include a controller that monitors a parameter of the fluid flow in at least one of the fluid paths of the plurality of fluid paths to selectively control flow from the pressure source to the plurality of fluid paths. Such parameters can include any fluid parameters, including but not limited to a time of flow in, a volume of flow, a pressure, a time of flow, and a combination thereof. The system can be configured to provide instantly switchable heart rhythms.

In additional variations, the system is lightweight o provide a portable beating heart simulator.

Variations of the access device and procedures described herein include combinations of features of the various embodiments or combination of the embodiments themselves wherever possible.

BRIEF DESCRIPTION OF DRAWINGS

FIGS. 7A and 7B illustrate an example of an expandable device.

DETAILED DESCRIPTION

Methods and devices described herein provide for preparing a training model of an animated heart typically in a cadaver. The present disclosure also includes a system for displacing a heart tissue within a heart to reproduce a beating pattern.

Figure 1:
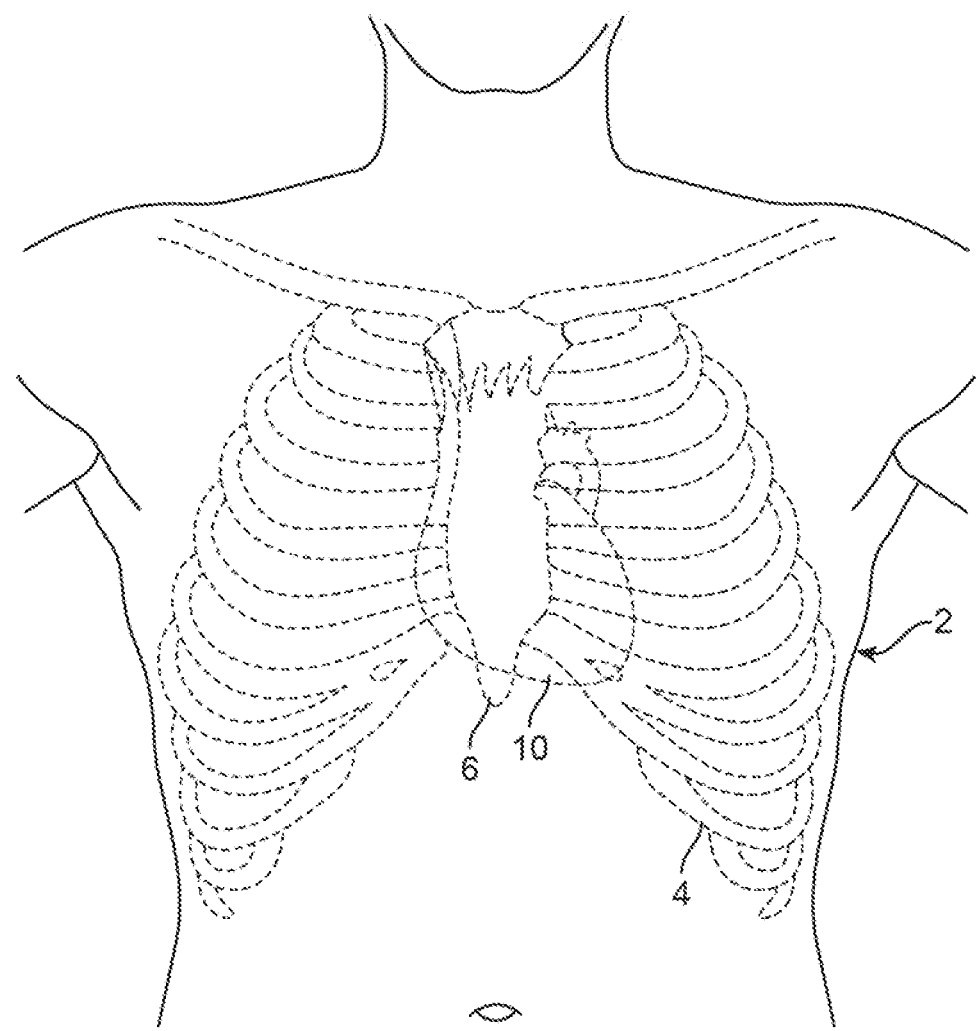
FIG. 1 provides a partial view of a body to illustrate anatomy of that a physician encounters when performing a surgical procedure on organs.
Figure 2:
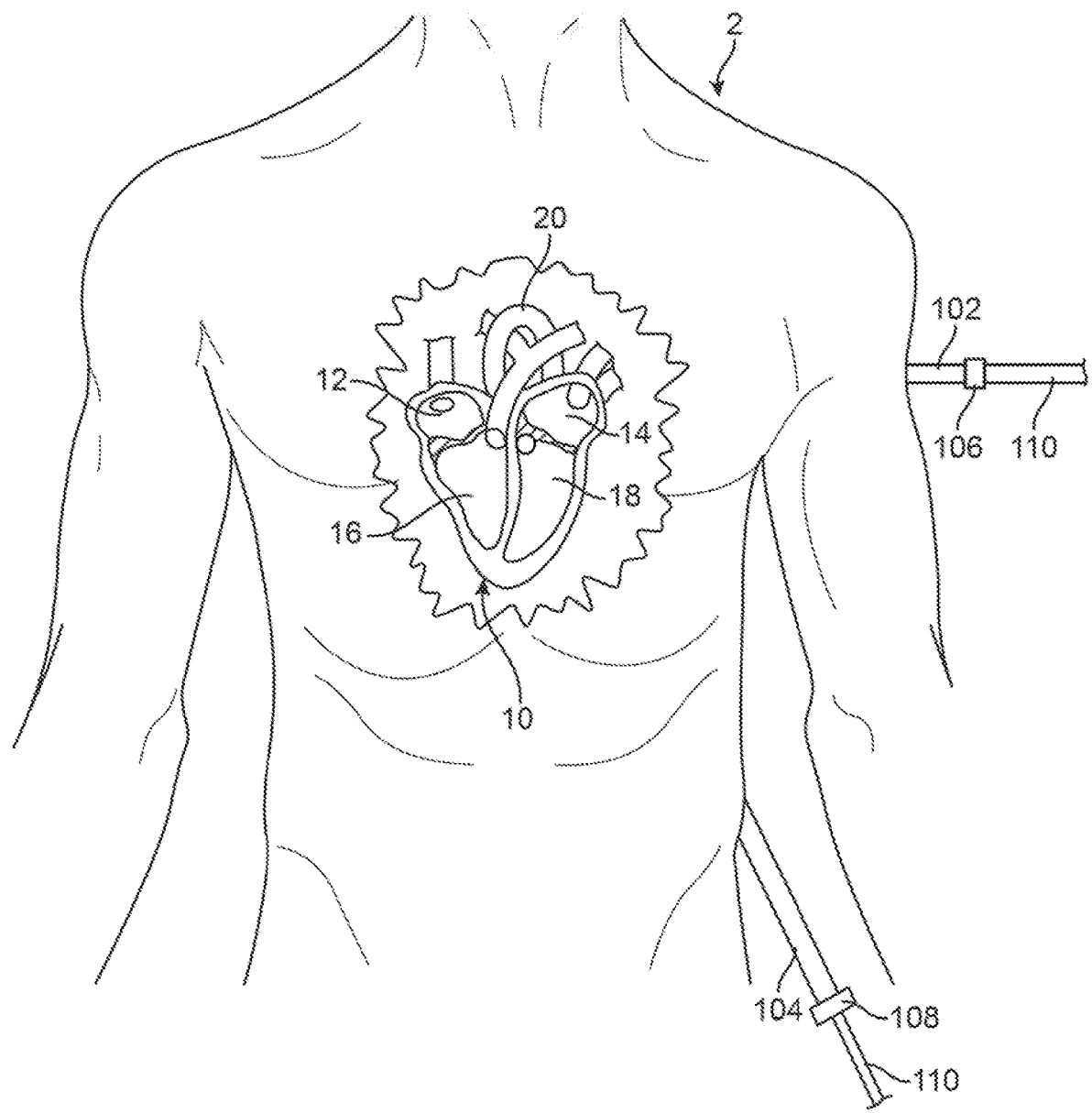
FIG. 2 illustrates a partial view of a cadaver showing the heart within the cadaver and advancement of devices for animating the heart.

FIG. 2 illustrates a partial view of a cadaver 2 showing the heart 10 within the cadaver 2. In the illustration, the heart is shown as exposed for purposes of discussing the procedure of animating a heart 10 of a cadaver 2. As noted herein, the process of animating a heart in a cadaver can be useful to provide a training model that allows a physician to practice a procedure in a realistic environment. Alternatively, animating the heart 10 can provide a background for the development of new procedures and/or devices FIG. 2 illustrates a condition where one or more tubes 102, 104 are advanced through openings in the body (not shown) for ultimate placement in any one of the chambers of the heart 10. As discussed below, variations of the methods and device can include placement of an expandable member in either a right ventricle 16 or left ventricle 18 of the heart. In additional variations, expandable members can be positioned in the right and left atriums 12, 14. Variations of the method can even include positioning of an expandable member into a single chamber or positioning of an expandable member across both an atrium and ventricle. In some variations, positioning of the tubing 102, 104 into the Chambers of the heart 10 occurs via navigation of the tubing 102, 104 through one or more major vessels 20 that provide a path into the heart 10. Because the method is being performed on a cadaver 2 the entry points of the tubing, 102, 104 can he made at a convenient location within the body that otherwise wouldn't be possible when performing a procedure on a live subject. For example, if the openings do not impact the intended training procedure, openings can be made in either (or both) the anterior posterior and lateral sides of the cadaver 2 in order to successfully navigate the tubing and expandable members to the desired location. Again, as noted above, most methods under the present disclosure allow for the heart 10 to remain within the cadaver 2 during performance of the training procedure. Alternatively or in combination the insertion points can be conventional access points via the neck, legs, or endoscopic access points to access the vessels leading to the heart.

FIG. 2 also illustrates the tubing 102 and 104 including connectors 106 and 108. As discussed below, the connectors allow for direct or indirect coupling of the tubing 102 104 to a valve system. However, in order to navigate the tubing to the intended region of the heart 10, the connectors can optionally remain unconnected so that a stiffening or support member 110 assist in placement. of the :tubing. The support member 110 can be a tube or member that is stiffer than the tubing. Alternatively, or in combination, the support member 110 can be a steerable catheter, scope, and/or device that assists in navigation of the tubing to the desired. target.

Variation of the method and device can include the use of a single support member 110 for each tube that is intended to be placed. Alternatively, each tube can include its own support member.

Many alternative access paths exist for installation of the inflation devices, which are dependent upon the tissue parameters and/or the biodynamic action desired. These include the sternotomy, thoracotomy, mid-clavicular, subxiphoid, supra-manubrium, trans-diaphragmatic, or posterior approaches. Each offers advantages and may be selected based on the purpose of the animation. If a naive chest wall is desired for the purpose of teaching a minimally invasive procedure, a mid-clavicular or posterior approach may be desired.

In one variation, the inflation devices may be inserted through a small thoracotomy in the upper right thoracic quadrant. This incision exposes the superior aspects such as the aorta or right brachiocephalic artery, the superior vena cava or jugular vein, and the main pulmonary artery and/or the right bifurcated branch.

The inflation devices of adequate size may be placed into the vascular accesses and into respective regions of the heart: through the superior vena cava to the right ventricle through the tricuspid valve; alternatively, through the inferior vena cava into the right atrium to the right ventricle through the tricuspid valve. The inflation device for the right atrium would follow and sit above the tricuspid valve, facilitated by a "full right ventricle" and a blocked pulmonic valve by the aforementioned inflation device.

The left ventricle may be cannulated by an incision in the brachiocephalic artery or the aortic root, and placed retrograde through the aortic valve. The left atrium may be accessed through a trans-septal incision and the right, atrium via the superior vena cava or right atrial appendage in which a purse string is placed to secure it. The left atrium may be accessed by a right thoracotomy or by ports to allow thoracoscopic dissection of the right superior lung, which allows for access of the distal branch or the right superior pulmonary vein. To access the left atrium with better success of achieving left atrial appendage filling is via a right thoracotomy, or placement of ports to allow thoracoscopic dissection of the right superior lung, accessing a distal branch or the right superior pulmonary vein. Additionally, a long wire wound or a compliant guide wire may he used to place the inflation devices. This guide wire may be used internally or externally for placing the inflation device. The left atrial appendage may also be approached through the right superior pulmonary vein ostium of the left atrium and placing the inflation device the left atrial appendage by a thoracoscopic instrument through a port placed in the upper left chest wall. Pressure may be applied to the floor of the left atrium to guide the catheter and balloon to the left atrial appendage. Additionally, other steering devices and methods not described may also be used to place of the inflation devices.

Figure 3:
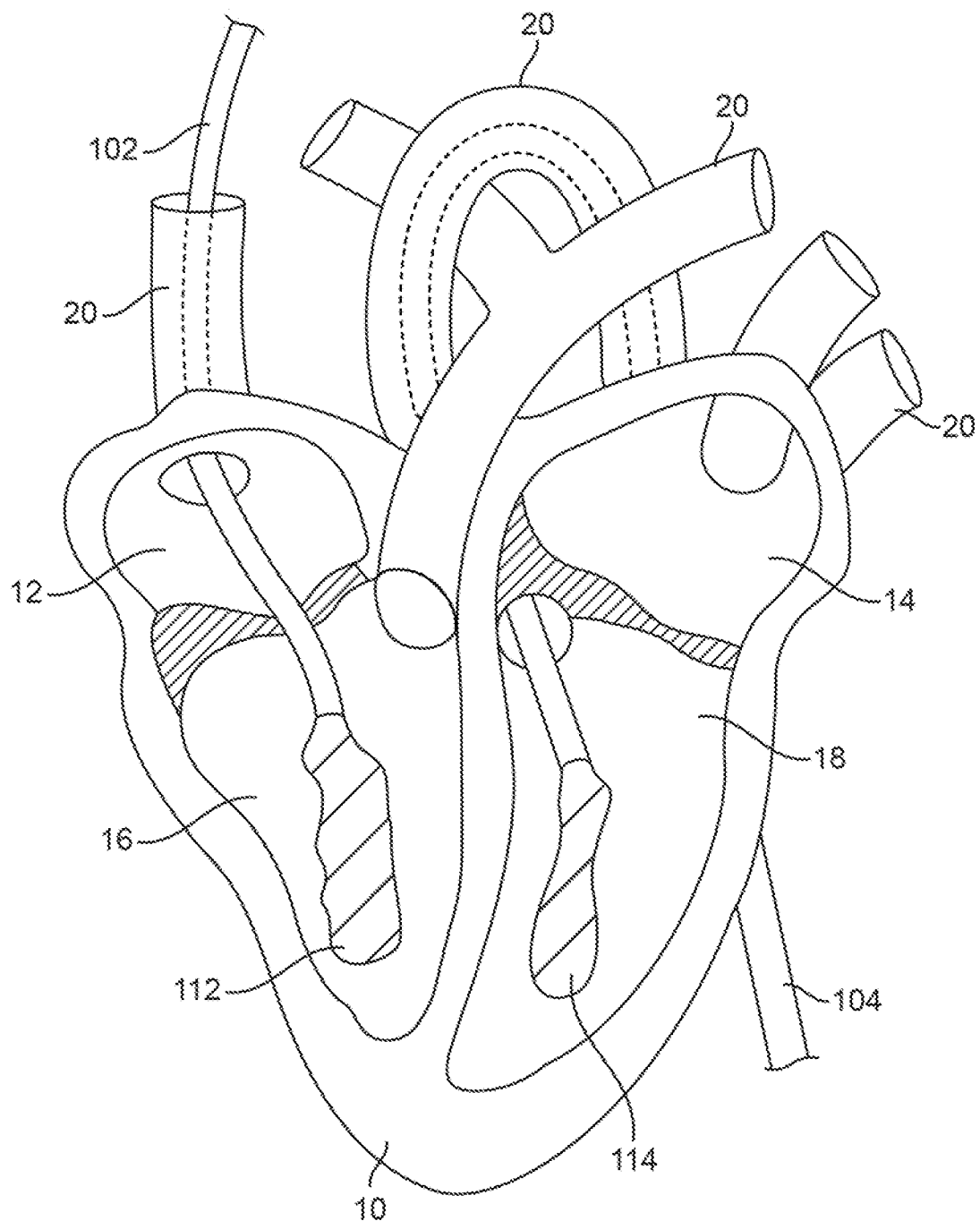
FIG. 3 illustrates a partial cross sectional view of a heart and major vessels. providing an access to the chambers of the heart with the devices positioned within the Chambers of the heart.

FIG. 3 illustrates a partial cross sectional view of a heart 10 and major vessels 200 providing an access to the chambers of the heart 10. Although the heart is illustrated alone, it is understood that, in most variations of the process, the tubing 102 104 are navigated through the body of the cadaver. FIG. 3 illustrates the tubing 102 and associated expandable member 112 advanced into the right ventricle 16 while a second tubing 104 and associated expandable member 114 is advanced into the left ventricle 18. The order of advancement of the expandable members into the ventricles can be based on convenience. Alternatively, variations of the device and method include a single expandable member advanced into a single ventricle to drive the movement of the heart 10. In an additional variation, a single expandable member can be positioned across adjacent chambers. As discussed below, additional expandable members and tubing can be positioned into each of the chambers of the heart (including the atriums 12 14). Furthermore, an expandable member can be positioned into the atrial appendage (not shown) or even into one or more of the major arteries 20. In an alternate variation, the tubing can include smaller expandable sections located proximal to the distal expandable members such that the smaller proximal expandable members provide a degree of movement and animation of the major vessels 20.

Figure 4:
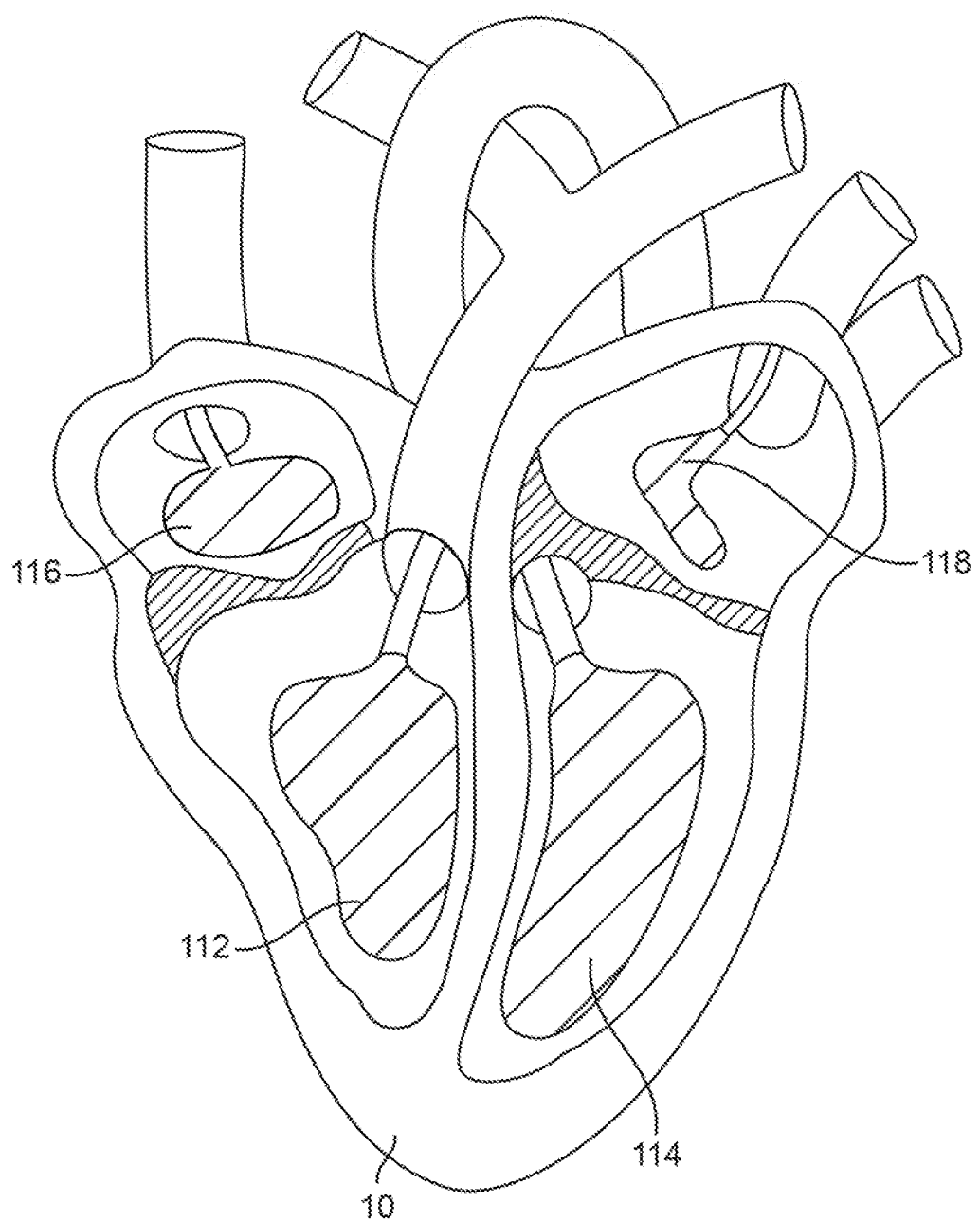
FIG. 4 illustrates a condition in the heart where expandable members are position into each respective chamber of the heart.

FIG. 4 illustrates a condition in the heart 10 where expandable members 112, 114, 116, 118 are positioned into each respective chamber 12, 14, 16, 18 of the heart. As shown, expandable member can be introduce into any vessel allowing access to the desired chamber. Moreover, two expandable members can be positioned through the same vessel. As shown, one or more of the expandable members can be shaped to match a profile of the heart chamber. Furthermore, the expandable members can be non-distensible or distensible in construction. Moreover, any one of the expandable members can include a combination of a distensible portion and a non-distensible portion (i.e., by the joining of respective materials or by positioning of a non-distensible constraint on a distensible material).

Figure 5:
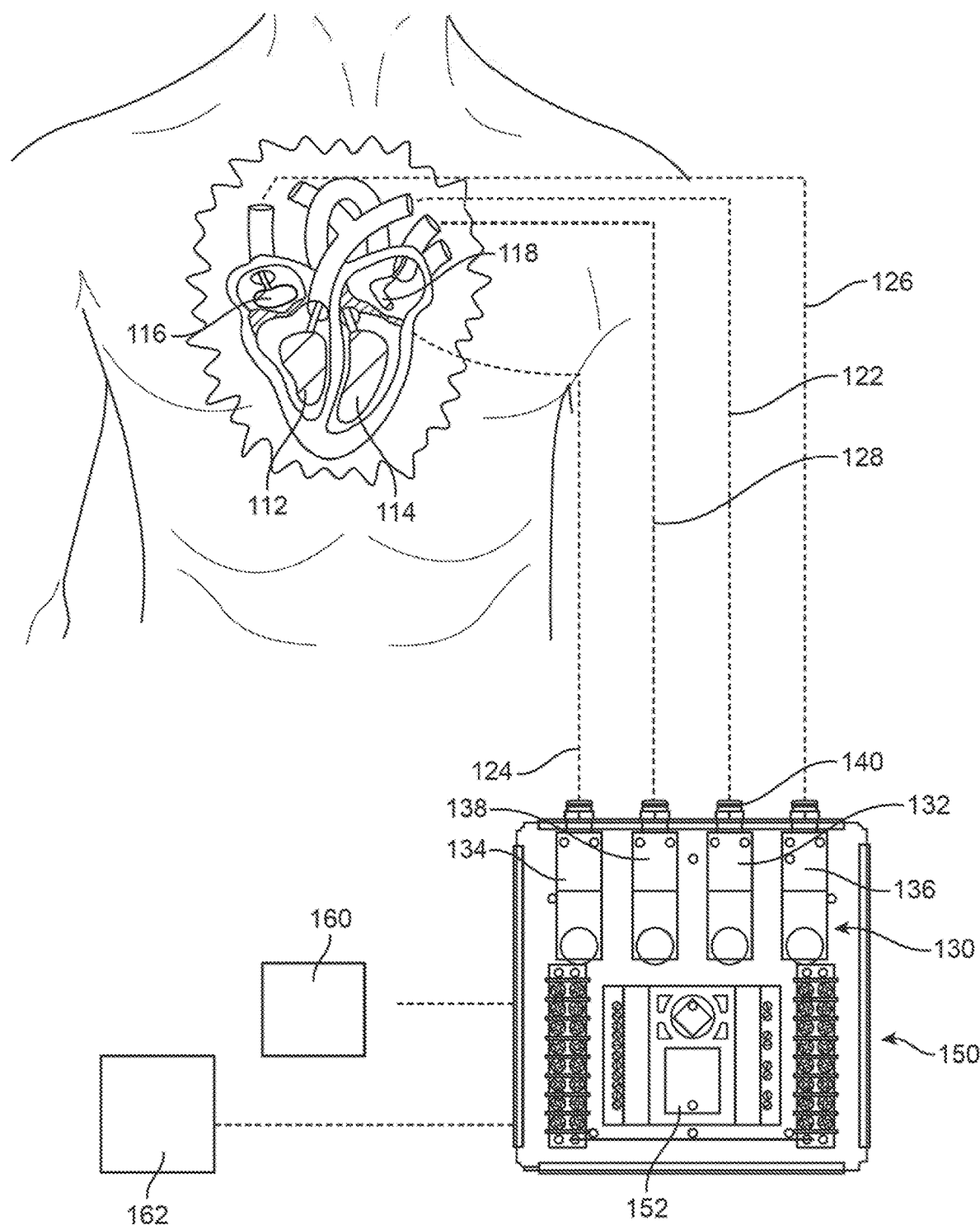
FIG. 5 illustrates a condition where the tubes are either directly coupled (via the connectors disclosed above) or indirectly coupled (via an intermediate extension member) to one or more connectors or fittings on a valve assembly.

FIG. 5 illustrates a condition where the tubes are either directly coupled (via the connectors disclosed above) or indirectly coupled (via an intermediate extension member) to one or more connectors or fittings 140 on a valve assembly 130. In the illustrated variation, the valve assembly 130 comprises individual valves 132, 134, 136, 138 that are in fluid communication with a pressure source 160. The pressure source 160 can be a standalone source of fluid (either a liquid and/or a gas) such as air, carbon dioxide, or nitrous oxide. The pressure source 160 can be an air compressor, hospital air or carbon dioxide or compressed gas in a tank. In certain examples, the pressure source was set to between 5 to 30 psi in order to inflate the chambers of the heart within an optimal timeframe. The typical inflation pressure for a heart is only a few psi so in certain variations, the system times the valves to prevent the inflatable devices from filly inflating to a point where the heart can be damaged. Moreover, the system can include a single valve that controls all of the expandable members or multiple valves per expandable member.

Typically, the valve assembly 130 is coupled to a controller 152 that is configured to operate the valve assembly to selectively control flow from the pressure source 160 to the plurality of ports or valves to create a plurality of fluid paths 122, 124, 126, 128 between the pressure source and each of the plurality of expandable members positioned in the heart 10, such that the plurality of fluid paths 122, 124, 126, 128 are able to pressurize the respective expandable members to reproduce the beating pattern. The system can also include auxiliary components such as a fluid source 162 in the event that the training model requires a fluid to represent the effects of blood within the operative space.

Figure 6:
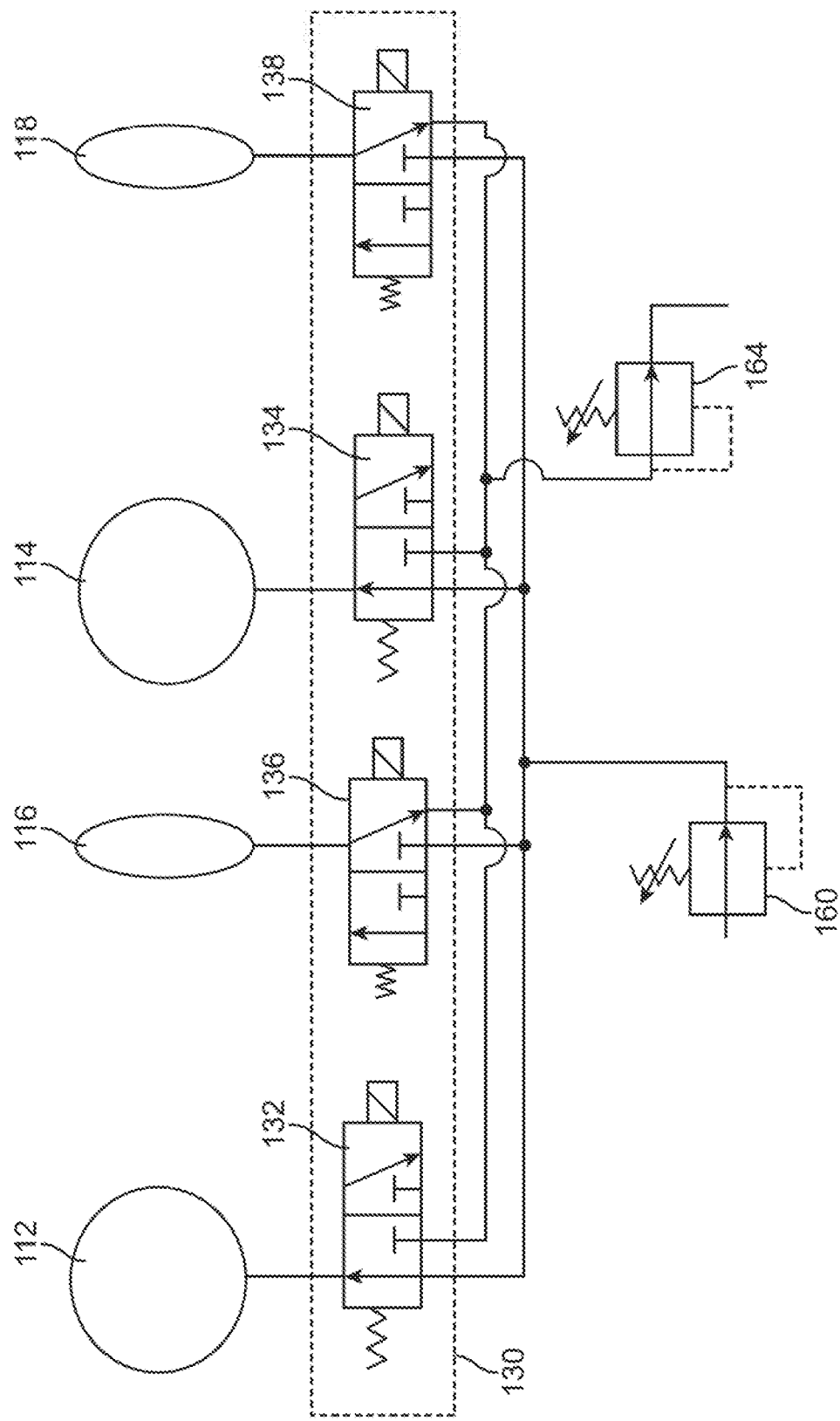
FIG. 6 illustrates a schematic of one variation of a system as disclosed herein.

FIG. 6 illustrates a schematic of one variation of a system as disclosed herein. In this example the valve assembly 130 comprises individual valves 132, 134, 136, 138 that are in fluid communication with a pressure source 160 as well as the respective expandable members 112, 114, 116, 118. In the illustrated example, the pressure source 160 pressurizes the valve assembly such that the valves (being controlled as discussed herein) establish flow lines to the expandable members 112 114 in the ventricles. The same valve assembly 130 can establish alternate flow lines between expandable members 116 118 in the atriums and an exhaust 164 that allows deflation or decompression of the expandable members 116 118 in the atriums. The valves can be controlled as noted herein to provide beating heart patterns to simulate a beating heart pattern selected from the group consisting of: a normal beating heart rate from 60 to 100 beats per minute, a tachycardia rate, an atrial fibrillation, and a ventricular fibrillation. Moreover, the system 150 shown in FIG. 5 can be configured such that the controller 152 monitors a parameter of the fluid flow in at least one of the fluid paths of the plurality of fluid paths to selectively control flow from the pressure source to the plurality of fluid paths. The parameter can be any fluid parameter that allows for obtaining the simulated beating heart pattern. Such parameters include, but are not limited to: a volume of flow, a pressure, a time of flow, and a combination thereof.

In one variation, the valve assembly 130 is sequenced with a controller 152 that is programmed to simulate various heart rates and rhythms including tachycardia, atrial fibrillation, ventricle fibrillation etcetera. In addition to preprogrammed rhythms each valve could be controlled by a variable input signal. The controller 152 can comprise a Programmable Logic Controller (PLC), Alternatively, the valve assembly can be sequenced using a microcontroller, Personal Computer (PC), or Field-Programmable Gate Array (FPGA).

The input to the valves is preferably a readily available gas such as air, carbon dioxide, or nitrous oxide. The source can be an air compressor, hospital air or carbon dioxide or compressed gas in a tank. Alternatively, the pressure source can supply such as water. The input pressure to the valves is in the range of 5 to 30 psi in order to inflate the chambers of the heart within the timeframe required.

The unit can be battery powered or can rely upon standard 120v AC power. supplied in order to accommodate various international power requirements. The output of the power supply can be classified as Low Voltage, Limited Energy (LVLE) for electrical safety. The vales and the PLC are powered by 24 VDC.

The beating heart simulator can use any number of inflatable device such as an elastic balloon or non-elastic member like a bag or non-distensible balloon that is attached to the end of an elastic tube. FIGS. 7A and 7B illustrate one example of such an inflatable device 100. As shown, the inflatable device 100 can include an elongate tube 102 coupled to an expandable member 112. The configuration can comprise a balloon-catheter configuration. Alternatively, the expandable member 112 can be detachable from the tube 102 to allow the user to couple an expandable member having desired properties such as elasticity, non-distensible, shape, etc. As shown, the device 100 can optionally include a support member 110 removably coupled to the tube 102 and/or expandable member 112. The support member 110 can comprise a stiffening tube, scope, and/or a steerable device that assists the user in positioning the device 100 through the anatomy of the cadaver and into the heart. In order to achieve realistic simulation, a tube and expandable member are positioned in each of the four chambers the heart. In an alternate variation, the simulator can be simplified by connecting the ventricle and the atrium together with a wye connector and controlled with a single valve. In addition, as described above, an even simpler method is to only inflate the ventricles of the heart since they are the largest chambers. The tubing and/or expandable member in systems that include a plurality of tubings/expandable member can be visually distinguishable via color, shading, printing, etc. to reduce confusion when placing the inflatable devices or to direct the user regarding the appropriate chamber for the respective expandable member. FIG. 7A illustrates the tubing as including an optional connector 106. Once the device is positioned and the support member 110 is removed, the connector 106 can be coupled to a port on the valve (not shown) GE to an intermediate connector 120 that ultimately is fluidly coupled to the valve/pressure source to allow for expansion of the expandable member 112 as shown in FIG. 7B.

In an additional variation of the system, the tubing for each inflatable device can be connected to a solenoid controllable directional valve. A quick connect method to attached the tubing is preferred since the tubing and inflatable device will be single use in a cadaver application. The exhaust from the directional valve can go to atmosphere, vacuum, or preferably to a pressure relief mechanism to simulate diastolic pressure.

Figure 8A:
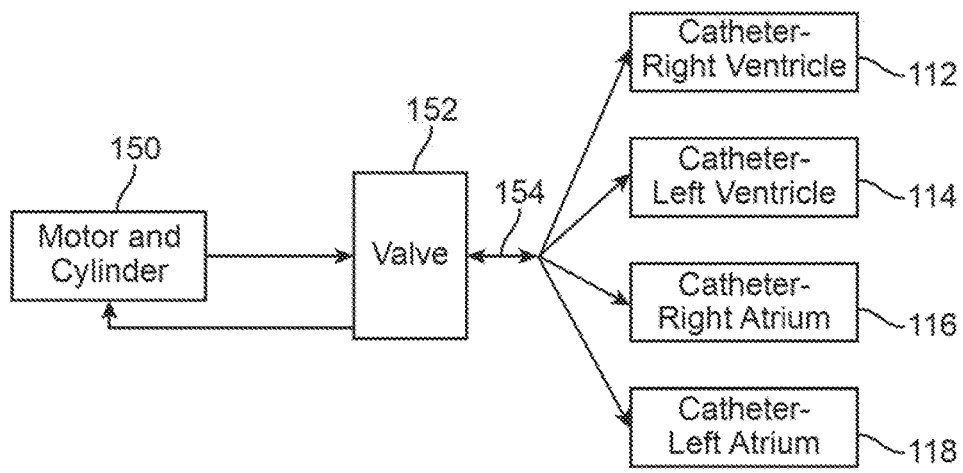
FIG. 8A illustrates a schematic of a simple system that is operated by a motor cylinder combination and single valve that establishes flowpaths the various expandable members.
Figure 8B:
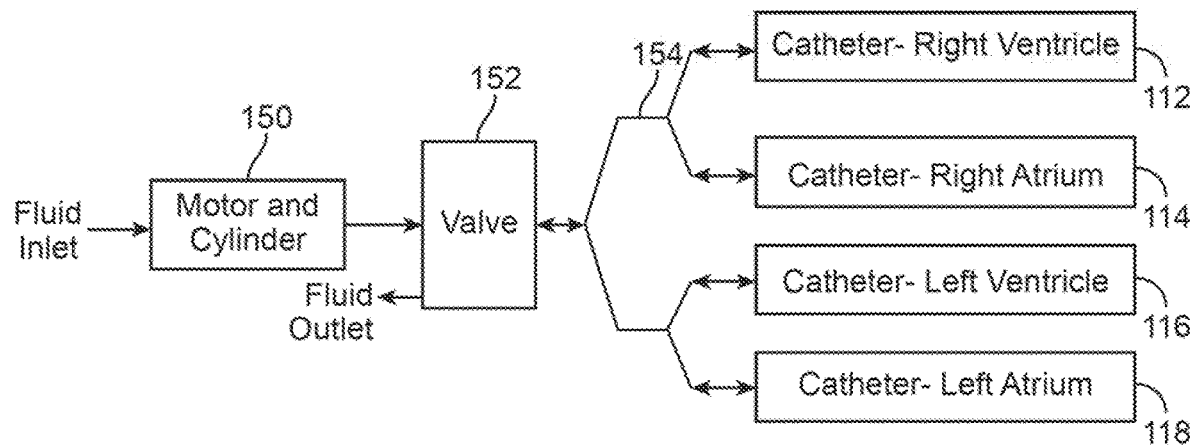
FIG. 8B shows the fluid path branching into two flowpaths and may optionally branch into more paths towards the organ.

The system 150 can comprise a digitally-controlled volume and pressure assist device system is described above By using the system, the heart in a cadaver can be reanimated to mimic how a heart beats in a surgical procedure. Additionally, while the systems and method disclosed herein are intended for use in a cadaver, the system may be used to animate a synthetic heart as well FIG. 8A illustrates a schematic of a simple system that is operated by a motor cylinder combination 150 and single valve 152 that establishes flowpaths the various expandable members 112, 114, 116, 118. As shown the fluid may be directed into four separate paths. Alternatively, the fluid may branch into two flowpaths 154 and may optionally branch into more paths towards the organ as shown in FIG. 8B. Once the organ is filled, it may be emptied and the fluid may passively flow back towards the valve due to the pressure gradient imparted by the inflation device. Additionally, the controller may actively impart the fluid flow with negative pressure to evacuate the inflation device. Depending upon the setup of the system, the fluid may flow out of the system or be recirculated. For instance, in a closed-loop system, the fluid would flow back towards the pump as shown in FIG. 8A. In an open-loop system, the fluid would exit the system from the valve as shown in FIG. 8B.

The system may be orientated in several different configurations. For instance, one motor can power the entire system. If one motor powers the system, it may optionally be connected to multiple pumps via multiple gears or pulleys to allow pump flow differentiation. Optionally, several motors may be used to power the system. When more than one motor is utilized, the motors may be set up in a parallel configuration meaning that each motor operates a pump independently from one another. In this configuration, the motor(s) may be controlled by a master controller. The motor(s) in the system may be a DC motor, a stepper motor, or any other motor known in the art. The system may optionally include one or more pistons and cylinders that may include an input and output for a fluid, which may include gas or a liquid.

The motors may be configured manually or electronically to selectively pump a fluid volume to either fully or partially inflate an inflation device. For example, a rotary DC motor may be connected to a piston in a cylinder via a variable length connecting rod, which may be configured to pump the desired fluid volume. Alternatively, a stepper motor can be programmed to drive a piston directly to generate the desired fluid volume. Additionally, a single motor can be connected to multiple pumps via gears or pulleys to selectively fill multiple inflation devices with different volumes.

Figure 9:
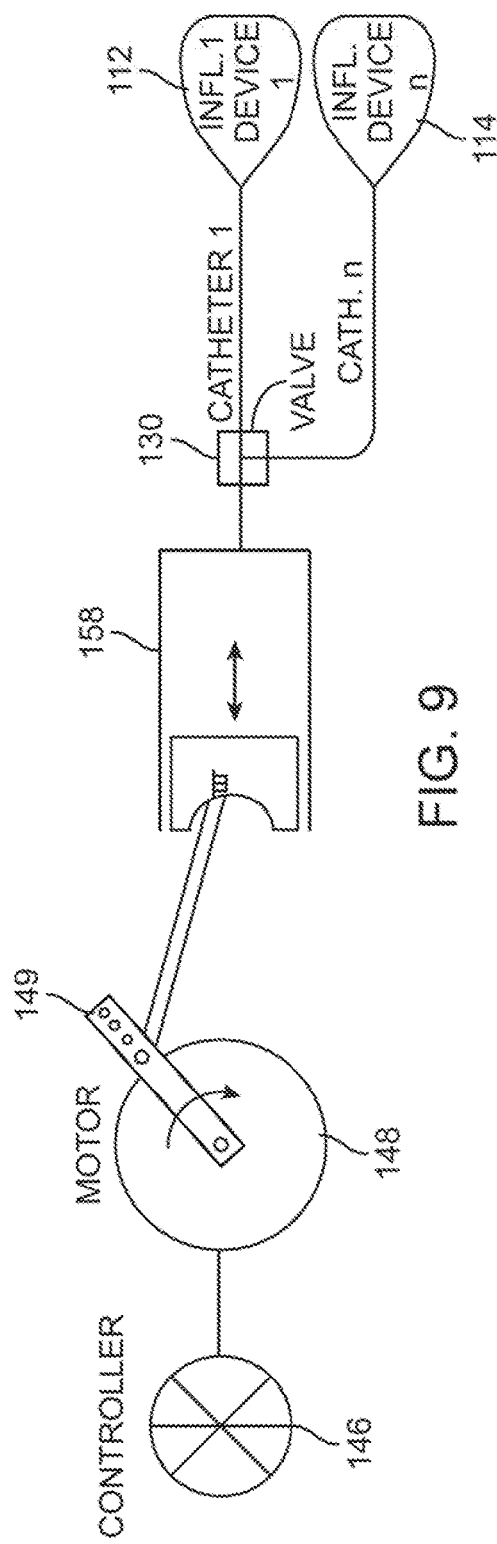
FIG. 9 shows an example of an analog system.
Figure 10:
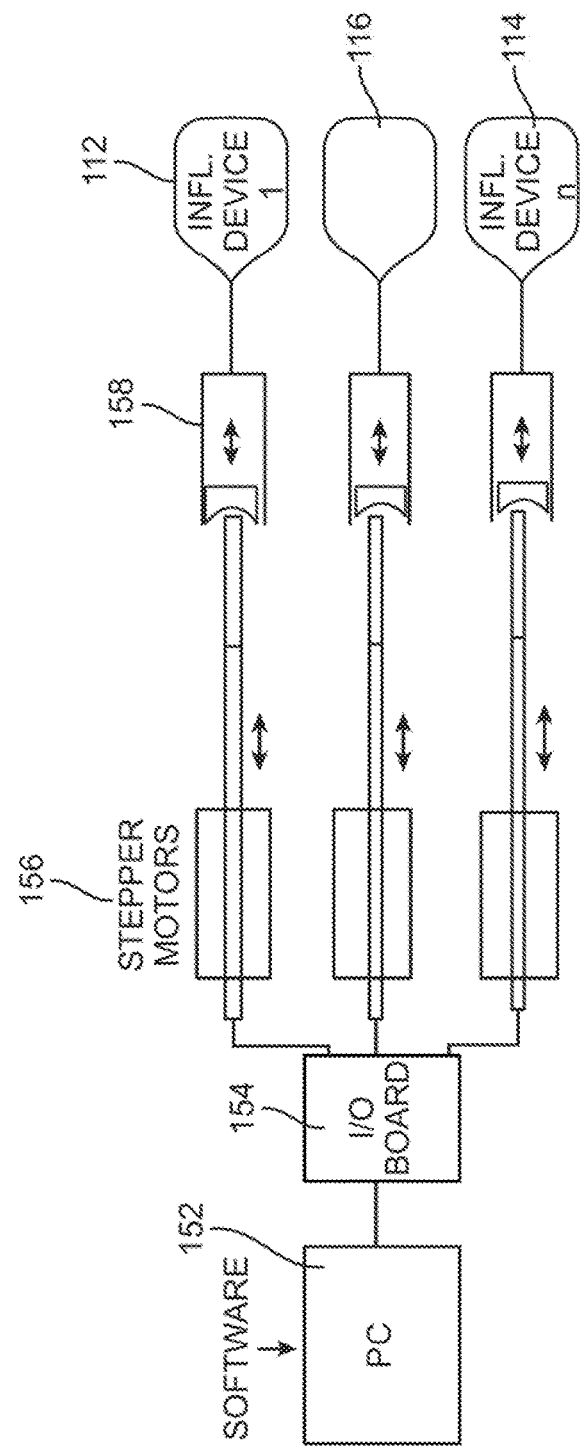
FIG. 10 shows an example of a digital system.

As shown in FIG. 9, an example of the analog system may be used. The control of the analog system may include the use of pressure gauges and a manually set volume and rate (frequency of beats) by the operator to control the system. The volume is set by a manually adjusted sliding arm 149 component attached to the motor 148 on one side and the piston 158 or fluid driver on the other. Pressure is monitored at the outflow of the fluid to the manifold 130 that distributes the fluid to the respective chambers and inflation devices 112 114. Volumes are adjusted to regulate pressure to a desired set-point—this would be an average pressure for one chamber and/or for each chamber individually. Also, an example of the digital system may be used as shown in FIG. 10. The control of the digital system includes the use of a software managed microprocessor system 152 with several inputs and outputs 154 to regulate fluid volume, pressure and frequency/rate of inflation and deflation. The system can include stepper motors 156 that drive pistons 158 which serve as the pressure source.

The system may be controlled by feedback. For instance, pressure and volume sensors may be used. The speed and/or travel of the motors may be monitored and may be modified in an open or closed loop manner to obtain the desired pressure and flow of the system. Pressure may change based upon the compressibility of the fluid, volume, or rate of flow. The system can be individually regulated by volume or pressure or may be regulated by both volume and pressure. Additionally, other control mechanisms such as adaptive control and fuzzy control may be utilized. If other control systems are not available, a manual control system may optionally work. For instance, a hand pump may be used to operate the system.

Safety features may additionally be included that limit pressure of fluid flow to avoid rupture of the inflation device or surrounding tissue. For example, a pop-off valve or regulator may be included. The pop-off valve may be a component of the analog system. A digital pressure transducer interfaced with the controller may optionally be added. The pressure transducer may be placed at the exit of the driver, or piston, in the outlet line to the inflation device, or in the inflation device. The pressure transducer prevents the inflation device from damaging the tissue of a subject. The pressure transducers reduce the need to manually interface the system because a pressure set point may allow the programmable feature to slow the system to achieve the set pressure and volume without exceeding either. For example, a line may kink, which may result in a failure in that respective chamber, and the pressure transducer will be affected. In another example, pressure limits set by a microprocessor based controller will have variably set limits which will automatically limit pressure and/or volume in each chamber. Additionally, pressure limits set by a microprocessor based controller will have variably set limits which will automatically limit pressure and/or volume in each chamber. The pressure and/or volume set point may optionally feature a digital controller.

Figure 11:
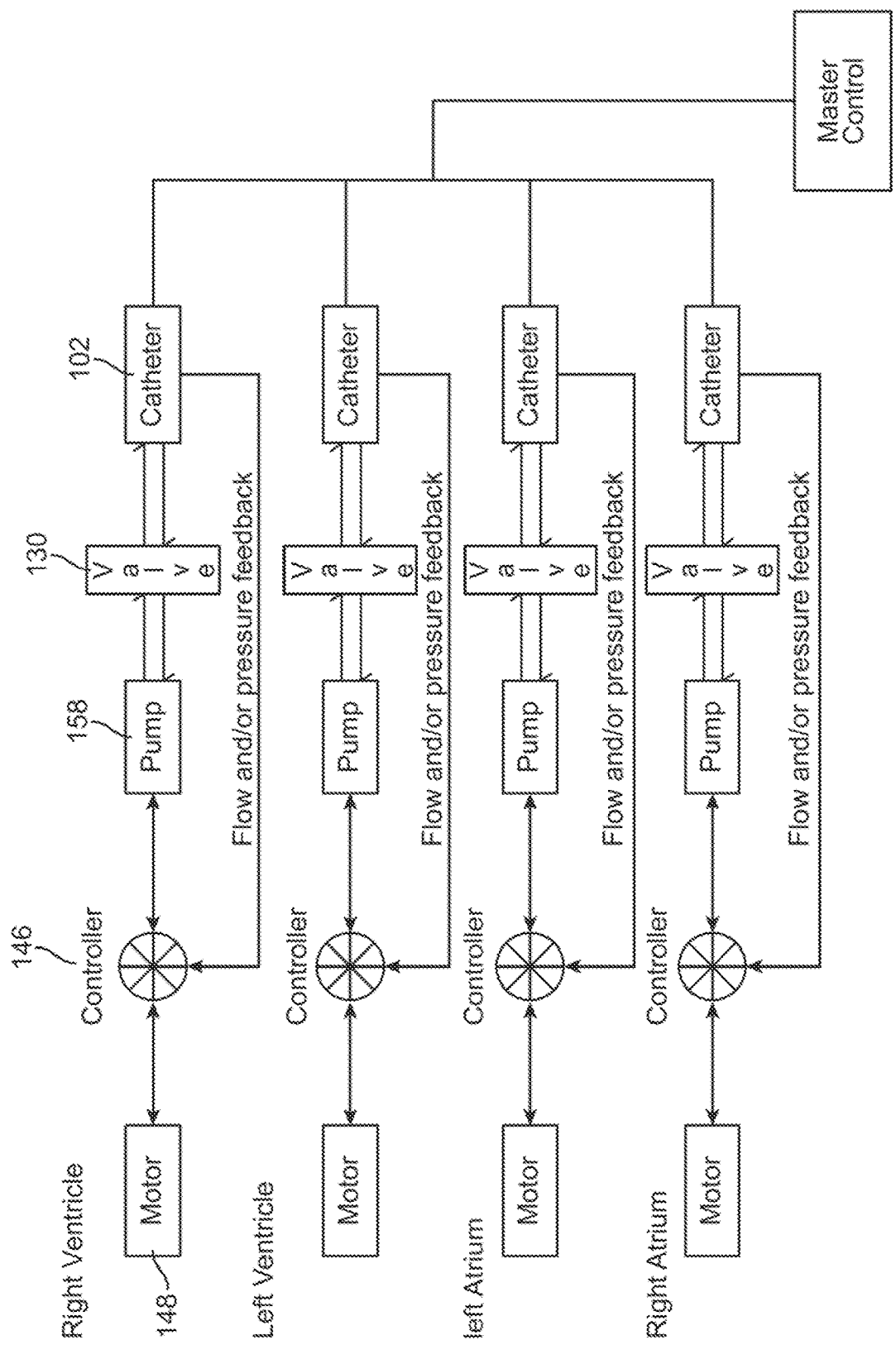
FIG. 11 shows an additional example of controlling the heart rhythm of the animated heart.

FIG. 11 shows an additional example of controlling the heart rhythm of the animated heart. As shown, a controller mechanism 146 may be added as a monitoring function to the feedback loop that may regulate the inflation response to match the desired rate and heart rhythm. For instance, a preset parameter may be chosen to operate to the controller interface.

As an example, to create an appearance of the left atrium with atrial fibrillation, the controller interface may be set to a particular drive rate and inflation volume. The motor 148 would drive the pump 158 to that volume and flow rate. The monitoring feedback loop would provide feedback to the controller that the response was within specification. If it was not, then the controller would be signaled to change rate and/or volume, which would alter the stroke length by increasing or decreasing the volume. The flow rate would be change by increasing or decreasing the frequency of the stroke.

Additionally, other controller positioning options are available. With one motor and one pump assembly, a manual controller may be used to control the fluid flow by regulating the motor. The manual controller may be placed between the motor and pump assembly. In this assembly, a pressure transducer may be used to monitor and regulate pressure delivered with each stroke that feeds a signal that triggers an indication to adjust flow and pressure to nominal levels. With a digital microprocessor controlled system, a plurality of transducers may provide feedback to the microprocessor and may automatically adjust and maintain the individual drivers to preset or manually inputted parameters into the digital control system. A touch screen, which also serves to give a visual display of monitored parameters, may be used in this setup.

In addition to atrial fibrillation, other heart rhythms may be mimicked by using similar methods. Please note that other setups utilizing a controller mechanism and feedback response may be utilized in addition to the method described above.

Additionally, other inflation devices may be utilized in the heart. For instance, an inflation device may be optionally be added to the right atrial appendage. Additionally, the system may work with only one inflation device. In addition to the heart, inflation devices may be inserted into other organs, such as the lungs. Alternatively, inflation devices may be placed into the space between the organs. For example, in the pleural space below the lung and pleural of the lung and the pericardial sac.

Although the present methods and devices have been described in terms of the embodiments above, numerous modifications and/or additions to the above-described preferred embodiments would be readily apparent to one skilled in the art. It is intended that the scope of the present inventions extend to all such modifications and/or additions and that the scope of the present inventions is limited solely by the claims of the invention.

What is claimed is:

1. A method of preparing a training model by animating a heart of a cadaver, the method comprising:
    advancing a first catheter having a first expandable member into a vascular body in the cadaver, where the vascular body is fluidly coupled to the heart of the cadaver;
    advancing a second catheter having a second expandable member into the cadaver;
    positioning the first expandable member into a first ventricle of the heart of the cadaver;
    positioning the second expandable member into a second ventricle of the heart of the cadaver;
    coupling the first catheter to a first fluid path, the first fluid path being in fluid communication with a positive pressure source;
    coupling the second catheter to a second fluid path, the second fluid path being in fluid communication with the positive pressure source that provides a fluid flow; and
    providing pressure to the first catheter and the second catheter; and
    monitoring a parameter of the fluid flow in the first catheter and the second catheter to control the fluid flow in the first fluid path and the second fluid path to pressurize and depressurize the first expandable member and the second expandable member respectively to produce a beating pattern in the heart of the cadaver.

2. The method of claim 1, wherein the first fluid path comprises a first valve, and where the second fluid path comprises a second valve.

3. The method of claim 2, where the positive pressure source comprises a plurality of inflation sources where at least a first inflation source is fluidly coupled to the first valve and where a second inflation source is fluidly coupled to the second valve.

4. The method of claim 1, further comprising an adjustable valve, where the first fluid path and second fluid path are fluidly isolated in the adjustable valve.

5. The method of claim 1, where the parameter of the fluid flow comprises a parameter selected from a group consisting of a time of flow, a volume of flow, a pressure, and a combination thereof.

6. The method of claim 1, further comprising:
    advancing a third catheter having a third expandable member into the cadaver;
    positioning the third expandable member into a first atrium of the heart of the cadaver;
    coupling the third catheter to a third valve that is fluidly coupled to the positive pressure source; and
    where monitoring the parameter of the fluid flow further comprises monitoring the parameter of the fluid flow in the third catheter to control the third valve to pressurize and depressurize the third expandable member.

7. The method of claim 6, further comprising:
    advancing a fourth catheter having a fourth expandable member into the cadaver;
    positioning the fourth expandable member into a second atrium of the heart of the cadaver;
    coupling the fourth catheter to a fourth valve that is fluidly coupled to the positive pressure source; and
    where monitoring the parameter of the fluid flow further comprises monitoring the parameter of the fluid flow in the fourth catheter to control the fourth valve to pressurize and depressurize the fourth expandable member.

8. The method of claim 1, where advancing the second catheter into the cadaver comprises advancing the second catheter into a second vascular body in the cadaver, where the second vascular body is fluidly coupled to the heart of the cadaver.

9. The method of claim 8, further comprising detaching a stiffening member from the first catheter prior to coupling the first catheter to the first fluid path.

10. A method of preparing a training model by animating a heart located in a body of a cadaver, the method comprising:
    advancing a first catheter having a first expandable member into a vascular body in the cadaver that is fluidly coupled to the heart of the cadaver;
    advancing a second catheter having a second expandable member into the cadaver;
    positioning the first expandable member through the body of the cadaver and into a first ventricle of the heart of the cadaver;
    positioning the second expandable member into a second ventricle of the heart of the cadaver;
    coupling the first catheter to a first fluid path, the first fluid path being in fluid communication with a positive pressure source;

coupling the second catheter to a second fluid path, the second fluid path being in fluid communication with the positive pressure source that provides a fluid flow; and providing pressure to the first catheter and the second catheter; and monitoring a parameter of the fluid flow in the first catheter and the second catheter to control the fluid flow in the first fluid path and the second fluid path to pressurize and depressurize the first expandable member and the second expandable member respectively to produce a beating pattern in the heart of the cadaver.

11. The method of claim 10, wherein the first fluid path comprises a first valve, and where the second fluid path comprises a second valve.

12. The method of claim 11, where the positive pressure source comprises a plurality of inflation sources where at least a first inflation source is fluidly coupled to the first valve and where a second inflation source is fluidly coupled to the second valve.

13. The method of claim 10, further comprising an adjustable valve, where the first fluid path and second fluid path are fluidly isolated in the adjustable valve.

14. The method of claim 10, where the parameter of the fluid flow comprises a parameter selected from a group consisting of a time of flow, a volume of flow, a pressure, and a combination thereof.

15. The method of claim 10, further comprising:

advancing a third catheter having a third expandable member into the cadaver;

positioning the third expandable member into a first atrium of the heart of the cadaver;

coupling the third catheter to a third valve that is fluidly coupled to the positive pressure source; and where monitoring the parameter of the fluid flow further comprises monitoring the parameter of the fluid flow in the third catheter to control the third valve to pressurize and depressurize the third expandable member.

16. The method of claim 15, further comprising:

advancing a fourth catheter having a fourth expandable member into the cadaver;

positioning the fourth expandable member into a second atrium of the heart of the cadaver;

coupling the fourth catheter to a fourth valve that is fluidly coupled to the positive pressure source; and where monitoring the parameter of the fluid flow further comprises monitoring the parameter of the fluid flow in the fourth catheter to control the fourth valve to pressurize and depressurize the fourth expandable member.

17. The method of claim 10, further comprising detaching a stiffening member from the first catheter prior to coupling the first catheter to the first fluid path.

* * * * *